(No Model.) 9 Sheets—Sheet 1.

B. L. & N. STOWE.
CIRCULAR LOOM FOR MAKING COMPOUND KNIT AND WOVEN HOSE.

No. 537,317. Patented Apr. 9, 1895.

WITNESSES:
L. C. Hills.
F. B. Keefer.

INVENTORS
Benjamin L. Stowe,
Nathan Stowe.
by Marcellus Bailey
their ATTORNEY (No Model.) 9 Sheets—Sheet 3.

B. L. & N. STOWE.
CIRCULAR LOOM FOR MAKING COMPOUND KNIT AND WOVEN HOSE.

No. 537,317. Patented Apr. 9, 1895.

*Fig. 3.*

Witnesses:
L. C. Hills
F. B. Keefer

Inventors:
Benjamin L. Stowe,
Nathan Stowe,
by Marcellus Bailey
their Attorney.

(No Model.) 9 Sheets—Sheet 6.

B. L. & N. STOWE.
CIRCULAR LOOM FOR MAKING COMPOUND KNIT AND WOVEN HOSE.

No. 537,317. Patented Apr. 9, 1895.

(No Model.) 9 Sheets—Sheet 7.
B. L. & N. STOWE.
CIRCULAR LOOM FOR MAKING COMPOUND KNIT AND WOVEN HOSE.
No. 537,317. Patented Apr. 9, 1895.

Witnesses
L. C. Hills.

Inventors
Benjamin L. Stowe
Nathan Stowe
Attorney (No Model.) 9 Sheets—Sheet 8.
B. L. & N. STOWE.
CIRCULAR LOOM FOR MAKING COMPOUND KNIT AND WOVEN HOSE.
No. 537,317. Patented Apr. 9, 1895.

Witnesses:
L. C. Hills

Inventors:
Benjamin L. Stowe,
Nathan Stowe.

(No Model.) 9 Sheets—Sheet 9.
B. L. & N. STOWE.
CIRCULAR LOOM FOR MAKING COMPOUND KNIT AND WOVEN HOSE.
No. 537,317. Patented Apr. 9, 1895.

Witnesses:
L. C. Hills
J. B. Keefer

Inventors:
Benjamin L. Stowe
Nathan Stowe
by Marcellus Bailey
their Atty.

UNITED STATES PATENT OFFICE.

BENJAMIN L. STOWE AND NATHAN STOWE, OF JERSEY CITY, NEW JERSEY; SAID NATHAN STOWE ASSIGNOR TO SAID BENJAMIN L. STOWE.

CIRCULAR LOOM FOR MAKING COMPOUND KNIT AND WOVEN HOSE.

SPECIFICATION forming part of Letters Patent No. 537,317, dated April 9, 1895.

Application filed October 11, 1894. Serial No. 525,569. (No model.)

*To all whom it may concern:*

Be it known that we, BENJAMIN L. STOWE and NATHAN STOWE, of Jersey City, in the county of Hudson and State of New Jersey, have invented certain new and useful Improvements in Circular Looms for Making Compound Knit and Woven Hose, of which the following is a specification.

We remark at the outset that all of the patents hereinafter referred to are those which have been granted to Benjamin L. Stowe, one of the applicants herein.

The loom to which our invention is directed is one designed to produce a compound woven and knitted tubular fabric of the kind set forth and claimed in Letters Patent No. 427,929, dated May 13, 1890—that is to say, a tubular fabric composed of woven and knitted plies interlooped or interlaced to form a solid homogeneous fabric. To this end, we combine with the knitting and weaving instrumentalities for forming the knitted and woven plies respectively, a mechanism whereby, during the knitting and weaving operations (which proceed simultaneously), certain of the weaving warps are carried in the direction of the knitted work over beyond the path of delivery of the knitting warp, whereby these weaving warps termed by us binder warps (which form part of the woven portion of the compound fabric) are interlaced or interlooped with the knitting warp stitches, thus producing the compound homogeneous woven and knitted fabric which we have in view.

The foregoing and other features of our invention can best be explained and understood by reference to the accompanying drawings, in which—

The loom shown in the drawings is one for weaving a tubular compound knitted and woven fabric of indefinite length intended for fire or hydraulic hose. The knitted fabric is upon the interior of the hose, and by the particular organization represented in the drawings, the loop stitches are upon the interior of the knitted work.

The woven portion of the hose is a single ply fabric; and the knitted portion is a fabric in which is incorporated a weft or filling, and straight longitudinal strands which extend lengthwise of the fabric and between the rows of loops of knitting warp. In other words, the compound fabric is made up of the usual warp and weft of a single ply woven fabric, and the usual strands employed in the manufacture of knitted hose. No other strands enter into the composition of the fabric except a series of small strands which are used as guides for those of the weaving warps hereinbefore called binders, and which while entering into the knitted ply of the fabric along side of the longitudinal strands, yet form in effect and primarily a part of the loom mechanism. They play no distinct part in the fabric itself and could be omitted therefrom, were it not for their mechanical function as guides for the binder warps.

The fabric is shown in Figs. 4, 5, 6, and 11. The parts entering into its composition are designated as follows: the knitting warp, $k w$; the knitting weft or filling $k f$; longitudinal strands $l s$; guide strands $g s$; weaving weft $w w$; and of the weaving warps, the binder warps (or those which beyond their regular function as weaving warps serve to interlock the woven and knitted plies) $b w$; and the others, or as we term them regular warps, $r w$.

As to the loom itself, the weaving portion is constructed on substantially the lines illustrated in Letters Patent No. 446,085, dated February 10, 1891, with such modifications as needed to combine with it the knitting instrumentalities; and in the knitting organization *per se* there is little of essential novelty, taking it as a whole, although some of the structural details are new.

We shall first give a general description of the machine and will then more particularly describe those parts in which our invention is comprised.

D is the central tubular pillar through which (as in the Letters Patent last named), the work is drawn by suitable take up devices; but as we do not use on the weaving shuttle the "forming packer" of the said patent, we provide the upper end of the tubular pillar with the usual weaving rim—such for example, as in Letters Patent No. 194,740, dated August 28, 1877. Within this tube and concentrically with it is placed the needle cylinder D' which contains the knitting needles.

The needle cylinder is fast to a stationary vertical central round rod $D^2$ hanging from and secured to a cross piece $D^3$ of the frame of the machine. The knitting needles are in grooves in the interior of the knitting cylinder, and their heels engage and are driven by a suitable cam groove in a cam sleeve $D^4$, fast to a sleeve $D^5$ mounted to revolve on the central stationary rod $D^2$. The revolving sleeve $D^5$ is driven from one of the shuttle driving shafts 3 (similar to those having a like distinguishing numeral in Letters Patent No. 446,085, dated February 10, 1891)—this shaft having on its extended upper end (see Fig. 1) a worm which engages a worm wheel on the counter shaft $D^6$, which at its other end meshes with and drives the sleeve $D^5$ by beveled gearing as shown.

B is the knitting shuttle and carries the knitting warp. It is of segmental form and has a body of the same general contour as that represented in Letters Patent No. 446,085. The same may be said of the other two shuttles A and C (Fig. 3) with which the machine is provided—C being the weaving shuttle which carries the weft for the woven ply, and A being the interlacing shuttle by which certain of the weaving warps—termed by us binders,—are carried inward toward the center of the machine beyond the path of the warp delivery nose or leader carried by the knitting shuttle B, for the purpose of being interlooped with the knitting warp. All of these shuttles run in a circular guide way or race in which they are held and supported by antifriction rollers 6, and are driven by pinions 2 on shafts 3 which gear with racks on the outer faces of the shuttles—all substantially in the manner illustrated in Letters Patent No. 446,085; and in their grouping and general arrangement they are similar to the three shuttles in Patent No. 194,741, dated August 28, 1877.

Figure 1:
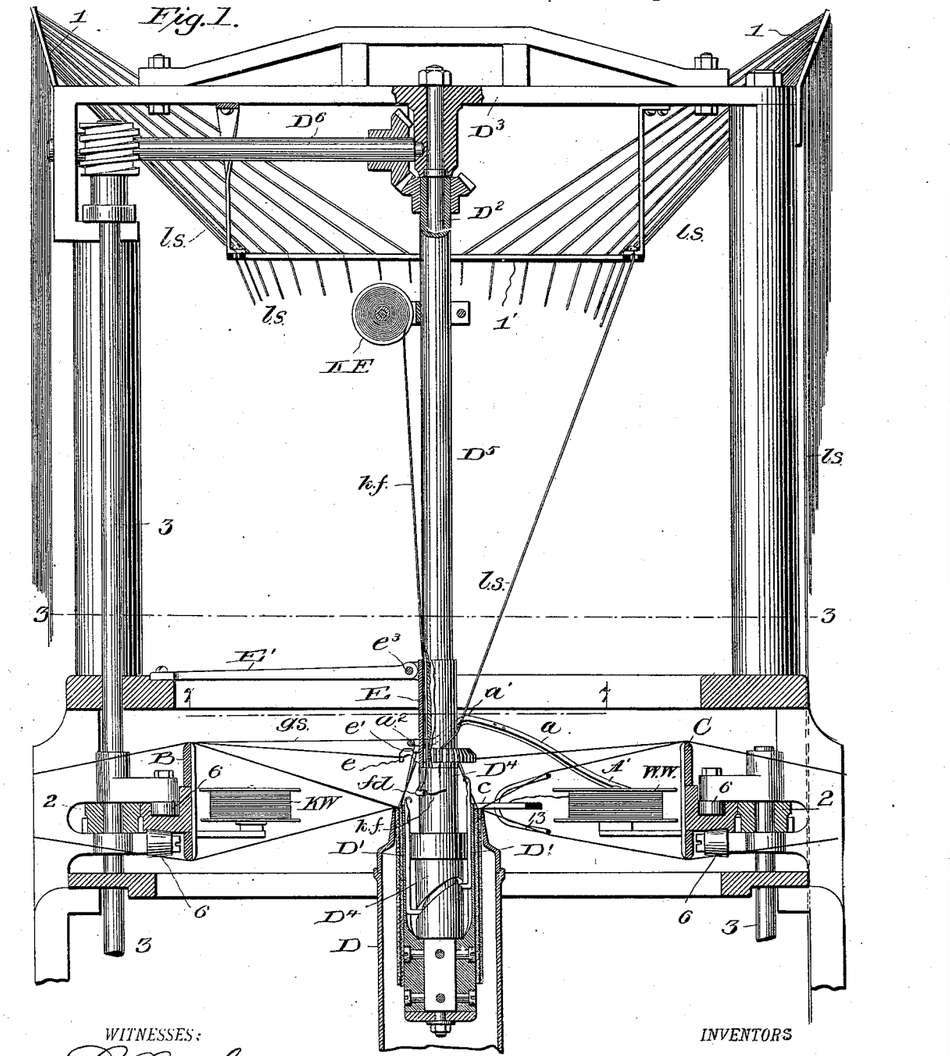
Figure 1 is a vertical central sectional elevation of so much of the combined weaving and knitting loom, as needed for the purpose of explanation.
Figure 2:
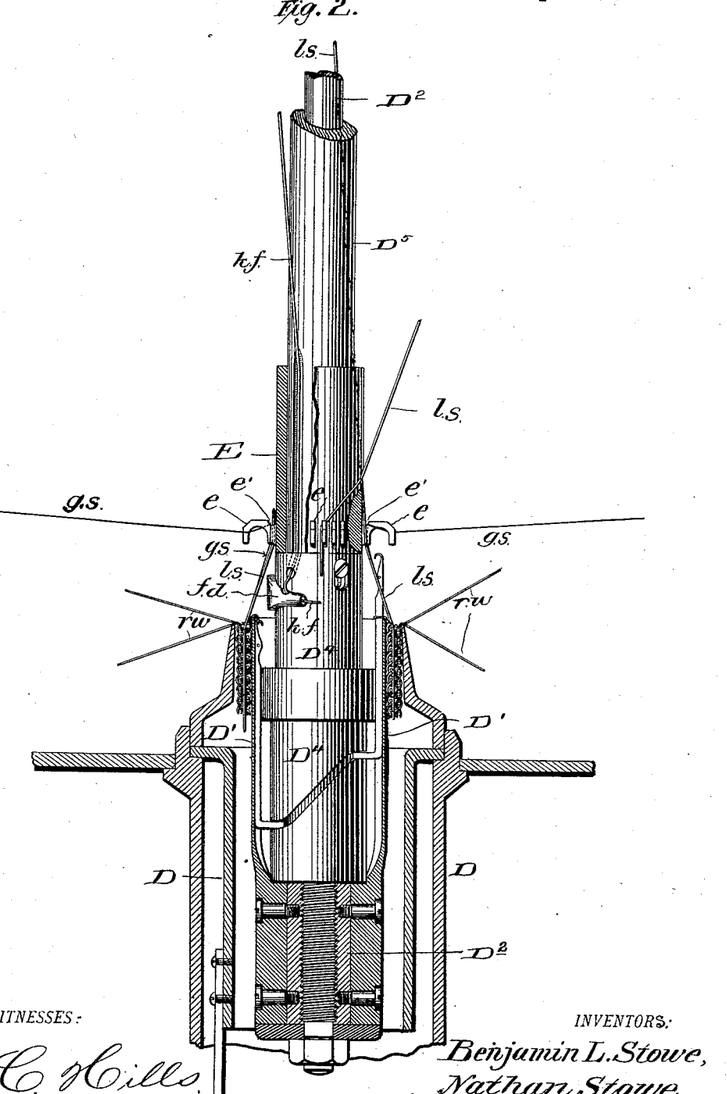
Fig. 2 is a vertical sectional elevation on enlarged scale, of the central portion of the loom.

The knitting weft or filling $k f$ is carried by a spool K F (Fig. 1) mounted on and fast to the revolving sleeve $D^5$. From the spool, the weft or knitting filling extends down to the delivery nozzle $f d$ through which it is threaded. On its way to the nozzle the knitting filling passes between the sleeve $D^5$ and the hub of a comb E which will be hereinafter more particularly referred to—being received for this purpose in a guide groove formed in the exterior of sleeve $D^5$. From the groove it passes through a passage formed for it in the cam sleeve $D^4$ below, and after emerging from that passage is threaded through the delivery nozzle $f d$ all as shown in Fig. 1. Of the comb E it is sufficient to say for the present that it is loosely mounted on the sleeve $D^5$ and does not revolve therewith but is stationary, resting on top of the cam sleeve $D^4$ and being held in position by an arm E' jointed at $e^3$ to the comb (Fig. 3) and at its outer end held to the outer ring of the loom frame by a screw and slot connection $e^4$ which will permit such slight circular adjustment of the comb as may be needed. It may be said further that the teeth $e$ of the comb furnish the means by which the guide strands $g s$ are assured in position at their inner ends, and that the intervals between the teeth form spaces for passage of the longitudinal strands $l s$, as well as temporary receptacles for the binder warps $b w$ when they are thrown inward beyond the path of delivery of the knitting warp $k w$ to the knitting needles.

Figure 9:
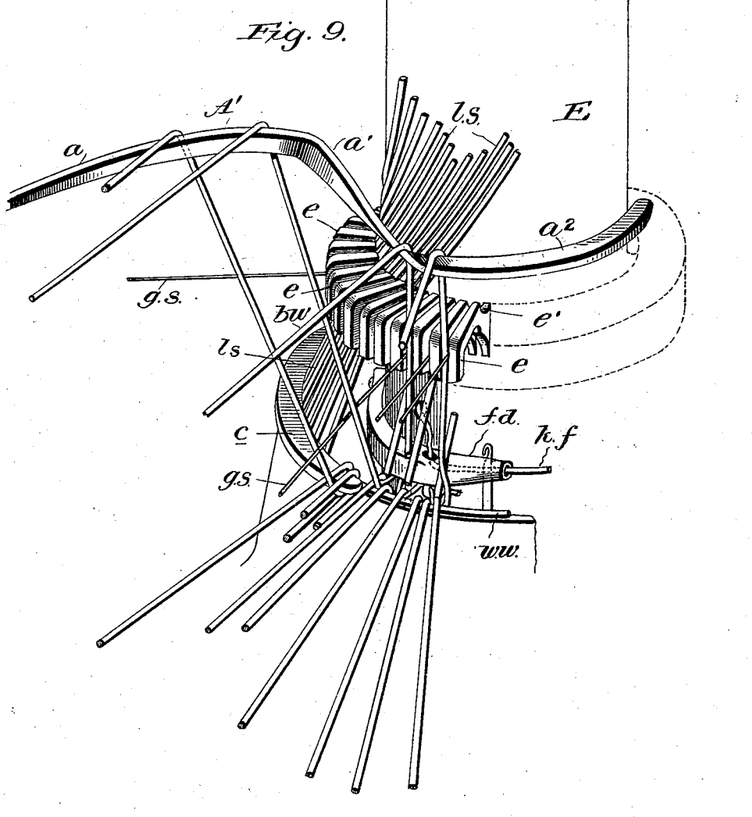
Fig. 9 is a like view, but still more enlarged, from the side opposite that in Fig. 8, intended to show more clearly the operation of the divider which controls the binder warps.

The knitting weft or filling nozzle $f d$ is formed and arranged, as indicated in Fig. 9, to deliver the filling $k f$ upon the outer or plain edge of the needles.

The longitudinal strands $l s$ come up usually from the room below that in which the loom is situated. They are provided with suitable tension to keep them taut, and they pass up to fixed guides $l$ from which they pass to and through holes in a stationary guide ring $l'$ (Fig. 1) whence they pass by way of the kerfs of the comb E into the fabric, being placed upon the outside of the knitting filling k f. From the ring l' they pursue a somewhat spiral course to the comb, being thereby drawn into the guide and retaining notches e' formed at the base of the upper edge of the comb teeth, and thus being assured in proper position. The notches e', it may here be said, although they are available for the purpose just mentioned, are primarily and principally intended to receive the bights of the guide strands g s, each of which strands take a turn about the base of its tooth.

Figure 10:
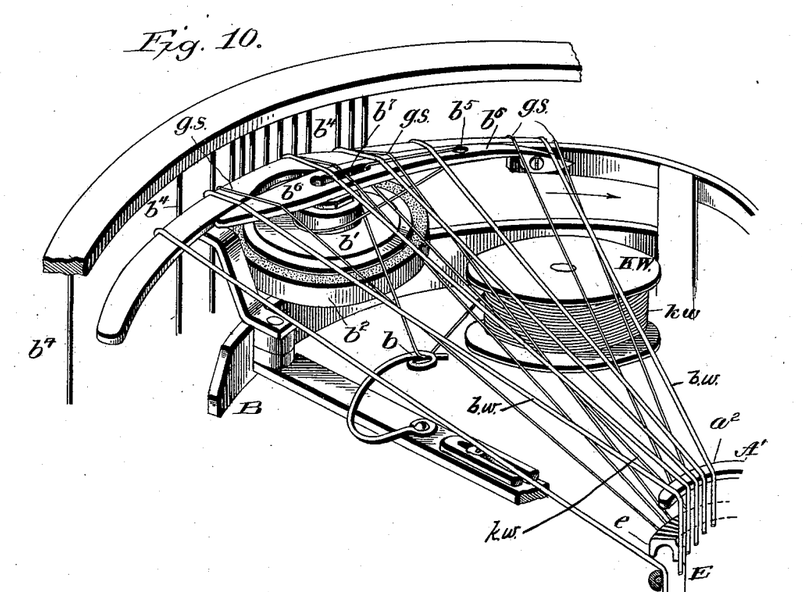
Fig. 10 is a perspective view, enlarged, of a portion of the shuttle which carries the knitting warp.
Figure 11:
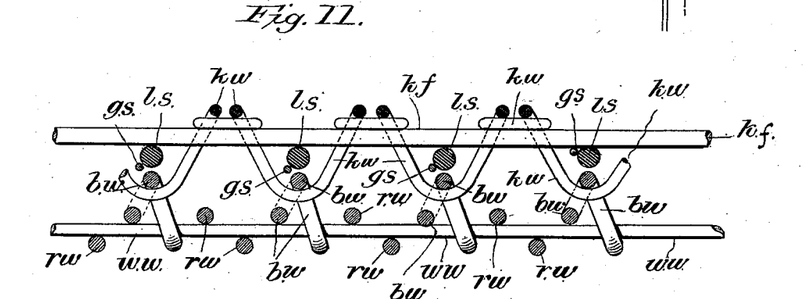
Fig. 11 is an enlarged horizontal section of a portion of the compound fabric.

The knitting warp k w is on a spool or bobbin K W, carried by the knitting shuttle B. In order to regulate the amount of thread given off by the bobbin, the knitting warp passes therefrom to and through a small eye b on the shuttle, whence it passes to and around a small rubber faced drum $b'$ (Figs. 3 and 10) fast to a relatively large disk $b^2$, mounted on the shuttle to revolve on an axis $b^3$. This disk, when the shuttle is in motion, is revolved in a direction to cause the drum to give off the thread, by a series of vertical guide wires $b^4$ set in a circle around the machine between the frame rings thereof—with which pins the disk is in contact. From the drum the thread passes to and up through an eye $b^5$ in a small flat table $b^6$ on the shuttle, thence along the top of the table and thence down through the same by way of a rather long slot $b^7$ whence it passes to the leader or delivery nozzle w d. The devices $b'$ to $b^7$ inclusive constitute the knitting warp tension. Tension upon the knitting warp is insured by the stress upon the warp itself as it is being taken to form the successive knitting loops, or failing that by the friction of the weaving warps in the upper shed which as shown pass over the shuttle B and in so doing bear heavily upon that portion of the knitting warp which extends on top of the table $b^6$ between the points $b^5$ and $b^7$. Any slack thread can drop through the elongated hole or slot $b^7$. The amount of thread given off, is governed by the size of the meter drum $b'$ and by replacing any drum by another of different size (the drum being removable for this purpose) this amount can be varied as desired. The leader or delivery nozzle w d is so located as to deliver its thread upon the hook side of the needles. It is carried by an arm m which is affixed to the end of a stem m' mounted and longitudinally movable in brackets $m^2$ on the inner part of the frame of the shuttle B and is pressed inwardly by a spring $m^3$, which will permit the leader to yield and move outwardly whenever occasion may require—at the same time holding it up to its position with yielding pressure. The relative positions of the leaders for the knitting warp and knitting filling are shown plainly in Fig. 7.

By the knitting instrumentalities described a tubular knit fabric of indefinite length can be made having incorporated in it a weft or filling and straight longitudinal strands.

The weaving shuttle C carries the bobbin W W for the weaving weft w w. It is provided with the separator 13 (similar in arrangement and function to the like designated part in Letters Patent Nos. 194,740 and 446,085) and with the usual weft leader or delivery nozzle c by which the weaving weft is laid in the outer woven ply in the same manner as in ordinary single ply hose—as indicated in Figs. 6 and 7.

Figure 4:
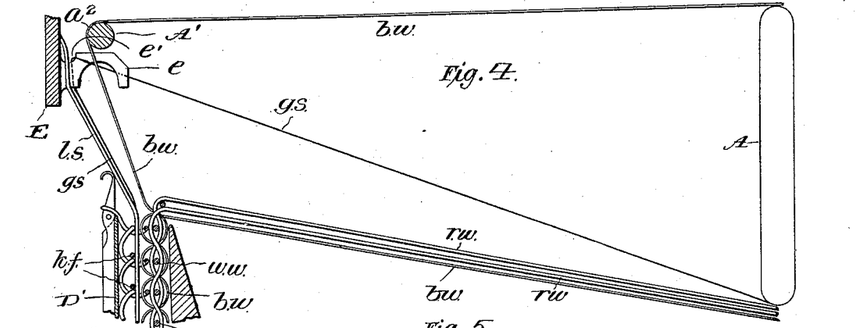
Figs. 4, 5, and 6 are views mainly diagrammatic, designed to illustrate the manner in which the hose is built up, the woven and knitted parts are interwoven, and the formation of the weaving warp shed at different periods in the cycle traversed by the shuttles.
Figure 5:
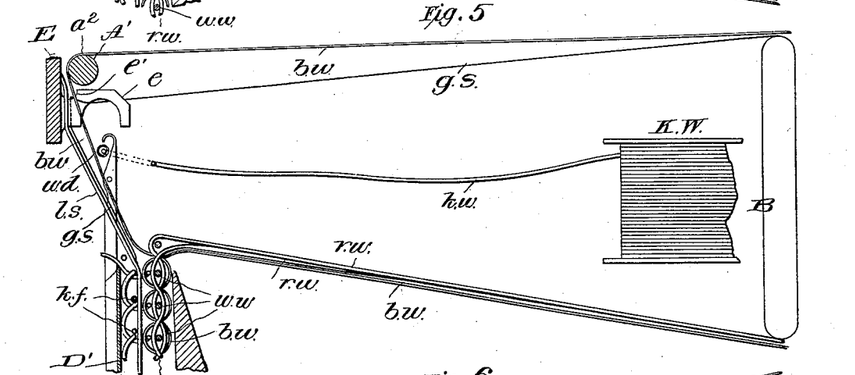
Figure 12:
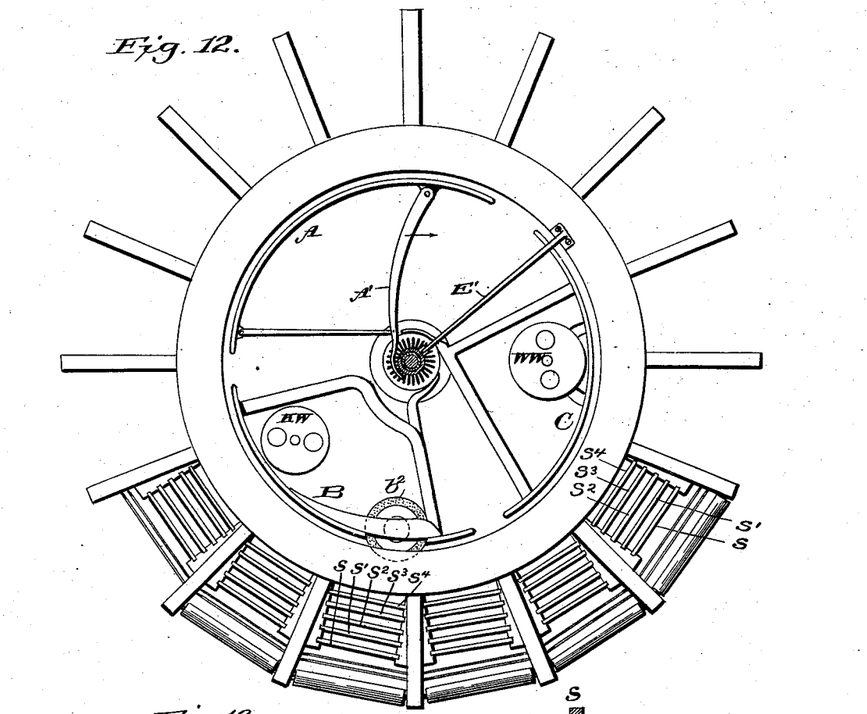
Fig. 12 is a plan of the outer ring of the frame of the machine within which the shuttles move, together with a representation of a number of the harness sections which extend around upon the outside of the loom, under the same general arrangement as that described in Letters Patent No. 446,085, dated February 10, 1891.
Figure 13:
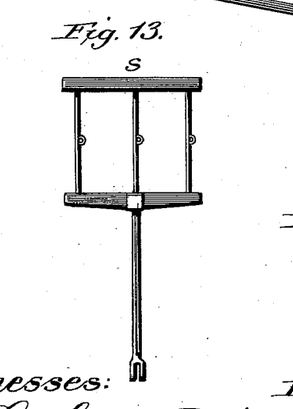
Fig. 13 is a face elevation of one of the harnesses.
Figure 14:
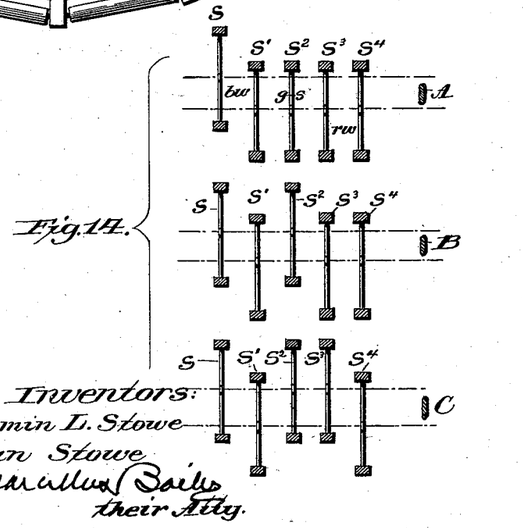
Fig. 14 is a view mainly diagrammatic of the positions assumed by the harnesses during one complete revolution of the shuttles—the harnesses being shown in side elevation.

The warp shed in which the weaving weft is laid has the same formation as in ordinary looms. The weaving warps which come from the outside of the machine, are manipulated by harnesses and are controlled by tension in the manner indicated in Letters Patent No. 446,085. The only thing which needs especial remark is that, as those of the weaving warps in the upper shed which we distinguish as binder warps require to be raised before their fellow regular warps, in order that they may pass above the thread or interlacing shuttle A, it necessarily follows that in each section the binder warps must have a set of harness and operating cams or rails (like those in Patent No. 446,085), distinct from those which operate the regular warps of that section. In other words there will be in each harness section, five harnesses, two for the regular warps, two for the binder warps, and one for the guide strands. They are arranged around the exterior of the loom frame in a circle surrounding the shuttles, in the manner shown in Letters Patent No. 446,085, and as indicated also in Fig. 12, the circle being divided into sections each of which contains the five harnesses s s', &c., appropriate to it—these harnesses being arranged to move up and down in suitable guides in the frame, and being actuated so as to move by appropriate mechanism, such for example as the harness levers, connecting rods, and revolving cam rings for operating the levers as illustrated in Letters Patent No. 446,085 above referred to. If, for example, we suppose the loom to be supplied with one hundred and ninety-two weaving warps and forty-eight guide strands then there would be sixteen harness sections each containing five harnesses. Each harness is formed (as seen in Fig. 13) to carry three strands. In each section the pair of harnesses s s' pertain to the binder warps, the pair $s^3$ $s^4$ to the regular warps and the single harness $s^2$ to the guide strands. The one pair of harnesses s s' operate the binder warps raising one half of them in front of the A shuttle and permitting the other half to remain down while the A B and C shuttles pass over them. The other pair of harnesses $s^3$ $s^4$ raise half of the regular warps in front of the C shuttle, the other half remaining down. This is made plain in Figs. 4 to 6 which represent the different positions assumed by the strands themselves, and in Fig. 14 which indicates the corresponding positions assumed by the operating harnesses. Between the A and C shuttles the binder warps which for the time being are to be in the top of the shed are lifted by their harness s (as indicated in the A position Fig. 14) and the shuttle A passes under them as seen in Fig. 4. This condition of affairs continues while the B shuttle is passing (as shown in Fig. 5 and in the B position Fig. 14)—the function of this shuttle being to carry the knitting warp bobbin and the mechanism for depositing a thread of that warp at a point where it will engage the hooks of the knitting needles. Between the B and C shuttles the regular warps which for the time being are to be in the top of the shed are lifted by their harness $s^3$ (C position Fig. 14) so that the C shuttle—which deposits the weaving weft—will pass through a shed the top and bottom of which are composed of both binder and regular warps as seen in Fig. 6. A complete revolution of the loom has now been made, and we begin again, the action of the loom being precisely the same as during the previous revolution except that upon the second revolution, the warp harnesses $s$ $s^3$ will remain down, and the harnesses $s'$ $s^4$ will rise.

Figure 6:
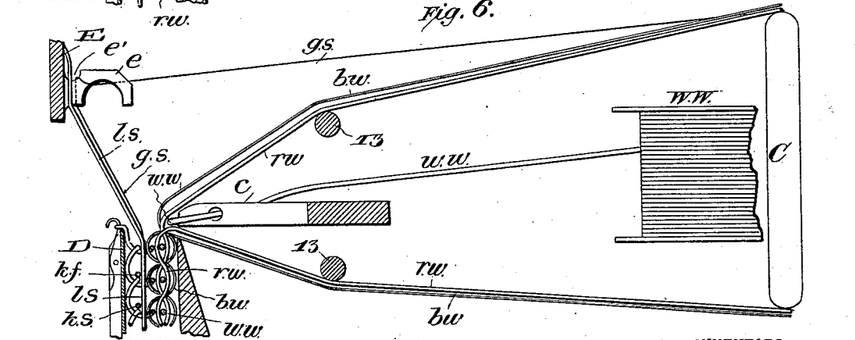
Figure 7:
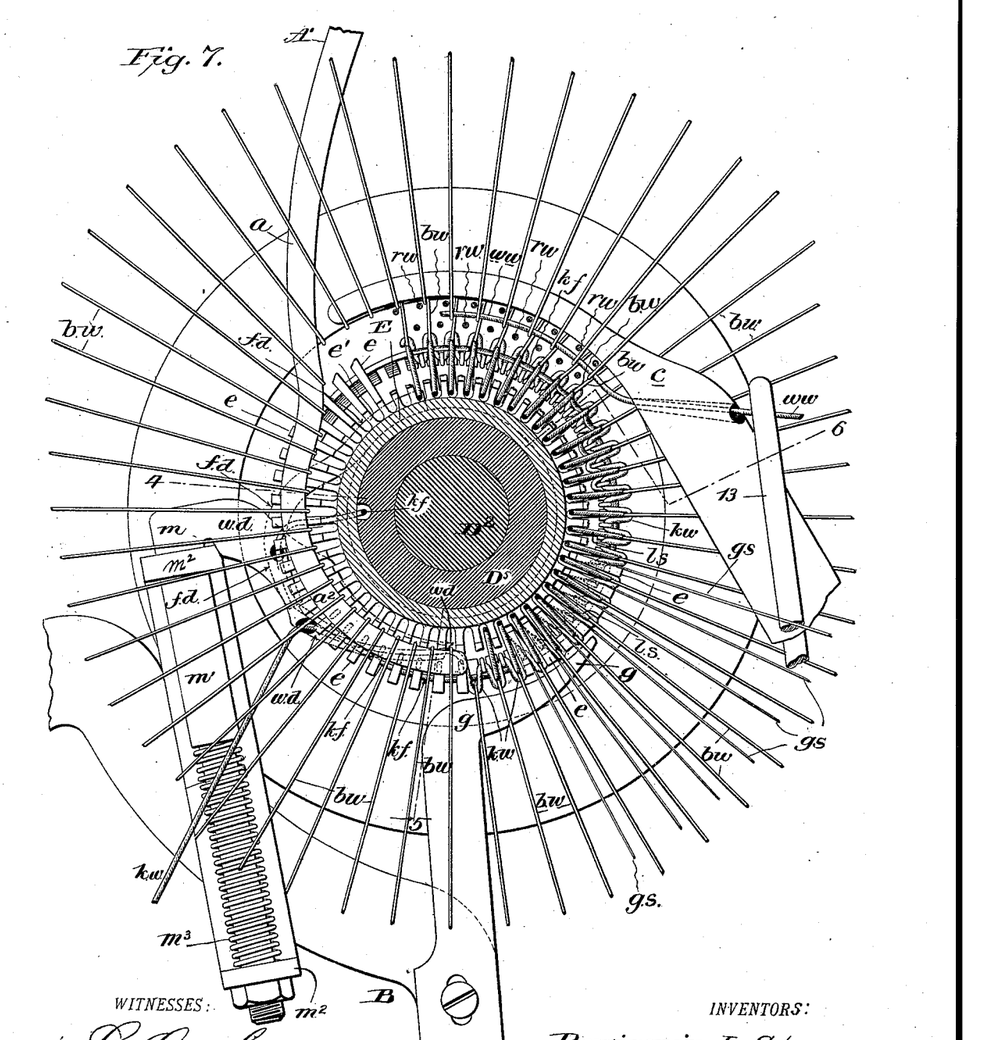
Fig. 7 is an enlarged section on line 7—7 Fig. 1, intended to illustrate more clearly the relative position of the thread delivering and controlling instrumentalities carried by the shuttles and in the more immediate proximity of the central knitting and weaving rings.

No notice thus far has been taken of the guide strands $g$ $s$ in Figs. 4 to 6. They and the manner of manipulating them will be hereinafter referred to.

The three shuttles A B C are similar in arrangement to the three segmental shuttles shown in Patent No. 194,741, dated August 28, 1877. While we use these three shuttles, the functions of two of them however are not the same as in the machine of the patent named. In our present machine, the third or C shuttle has the same function as in the patented machine. It deposits the weft in the regular shed and perfects a pick of woven fabric; but the second or B shuttle carries the knitting warp and mechanism for delivering it to the knitting needles, as above stated; and the first or A shuttle carries no filling whatever, it having to do with the binder warps only and its duty being to throw them into the kerfs between the teeth of the comb so that they will be engaged by the knitting mechanism and enter into engagement with the knitted fabric itself. Without the shuttle last named, there would be produced a tubular knitted ply encircled by but disconnected from a woven ply; but with it there is produced a homogeneous compound knitted and woven fabric; in which the two plies are in fact part and parcel of one and the same fabric.

Figure 3:
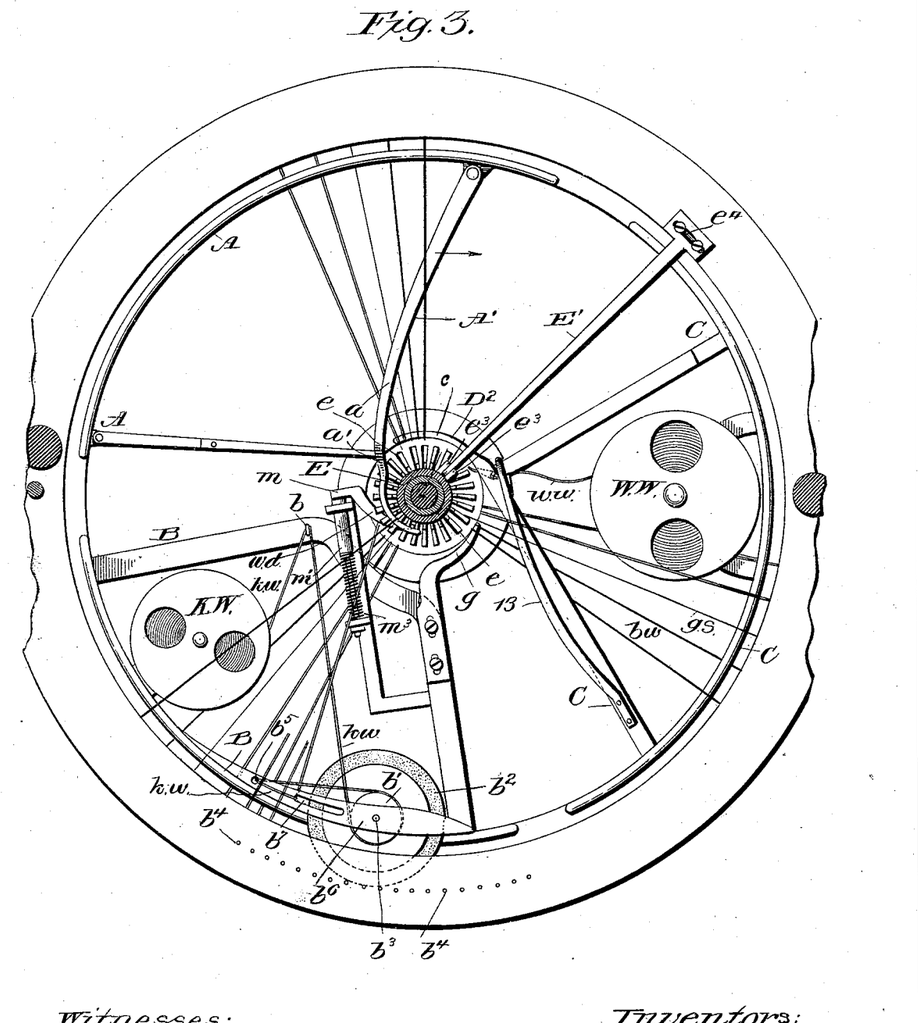
Fig. 3 is a section on line 3—3 Fig. 1.
Figure 8:
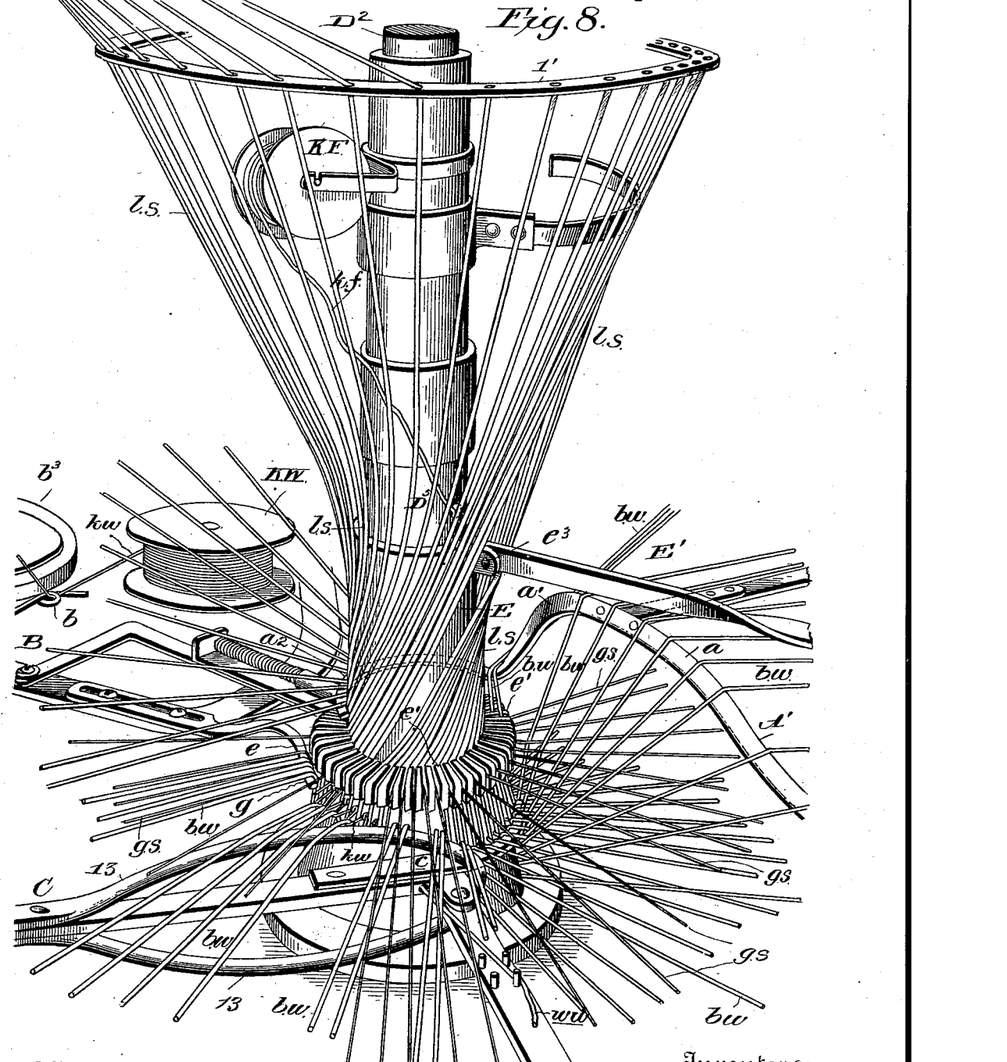
Fig. 8 is an enlarged perspective view of the central portion of the loom showing the relative positions of the various strands or threads, and the instrumentalities for delivering and controlling the same, at the knitting and weaving points.

The distinctive characteristic of the A shuttle, is the interlacing arm A' by which the successive binder warps are carried inwardly at their inner ends to a point over beyond the path of delivery of the knitting warp leader and are then precipitated into the spaces or kerfs between the teeth of the comb E, each binder warp having its own appropriate and particular kerf in that comb. These kerfs in the comb should come opposite the spaces between the knitting needles, and the comb is adjusted circularly to secure this end. The arm A' which is suitably braced and supported in the A shuttle is attached at its outer end to the body of the shuttle. It thence (as seen in Figs. 3, 7, and 8) extends in a rearwardly slanting direction relatively to the direction of movement of the shuttle indicated by the arrow in Fig. 3, rising gradually as it extends inwardly as seen at $a$. It thence makes an abrupt drop as at $a'$ and it then terminates in a horizontal portion $a^2$ which is located above the teeth of the comb E and is curved to approximately conform to the curvature of the hub of the comb, its extreme end being nearest to the hub. This end of the interlacing arm extends to the rear of the knitting warp delivery nozzle or leader $w$ $d$ the object being that it shall hold its binder warps inwardly beyond the path of delivery of the knitting warp until after that warp has been delivered and taken by its needles. When the knitting warp is thus positioned, the binder warps successively quit the interlacing arm, and by their tension and weights are drawn back, drawing with them the loops of the knitting warp, as indicated in Fig. 7. As the binder warps drop from the interlacing arm they are caught by the gage arm $g$ on the shuttle B which causes all of the binder warps to draw uniform lengths of loops of the knitting warp. The fabric by the conjoint action of the knitting warp tension, the hose take-up, &c., is beaten up and the operation thus proceeds.

It is essential that the inner ends of the binder warps should be accurately guided to their appropriate comb spaces into which they are delivered by the action of the interlacing arm A'. It is for this purpose that the guide strands $g$ $s$ are employed. These strands are comparatively small threads which lead from the outside of the machine, where they are provided with tension devices, weights, &c., as in the case of the weaving warps. They follow the same general radial path as the weaving warps and at their inner ends, as indicated more plainly in Figs. 4 to 6, they take a turn around the inner ends of the teeth of the comb E and thence pass down into the fabric along with the longitudinal strands $l$ $s$. Each guide strand has its own particular comb tooth. It extends rearwardly of the downwardly projecting outer end of the tooth, thence under and to the front of the horizontal portion of the tooth, thence up and over the base of the tooth into the notch $e'$, and thence down back of the base of the tooth to join the longitudinal strand $l$ $s$ which extends down through the space back of that tooth. The binder warp at the time the guide strand serves it is lifted at an abrupt slant (Fig. 8) so that it extends quite crosswise of the strand and thus the guide strand performs the office of directing the binder warp accurately to its appropriate space in the comb particularly as at this time the guide strand passes under the A shuttle (Fig. 4) which is the position it should occupy in order to do its work with accuracy. Manifestly however it cannot occupy this position while the B and C shuttles are passing, because in that event it would interfere with the delivery of the knitting warps as well as the weaving weft. Consequently it passes over the top of both B and C shuttles as seen in Figs. 5 and 6. The shifting of position of the guide strand is readily accomplished by its harness $s^2$, which will depress the guide strand between C and A shuttles so as to allow A shuttle to pass over it as shown in A position Fig. 14; and (as shown in B and C positions Fig. 14) will lift the said strand between A and B so as to let B shuttle pass under it, maintaining it in that position until C shuttle passes also, after which it will be again shifted as before.

The weaving shuttle C of course has a suitable weft tension.

All of the strands save the knitting warp and the weaving weft come from the outside of the machine, and can be led from any suitable point. The knitting filling has its bobbin on the central arbor of the machine for convenience sake.

The general operation of the machine will be readily understood by reference to Figs. 3 to 7. The direction of movement of the shuttles is indicated by the arrow in Fig. 3. They move in a circular path continuously and in unison.

Take as a starting point, the space between the A and C shuttles. As hereinbefore said, all of the warps in the upper shed fall at the rear of the C shuttle and then the binder warps which before were in the lower shed are lifted for the A shuttle to pass beneath them, all of the rest of the warps—both in the upper and lower shed as well as the guide strands, remaining down while the shuttle is passing. These binder warps the shuttle A gradually throws over successively into their appropriate kerfs in the comb E as indicated in Fig. 4. The horizontal curved inner end of the interlacing arm A' by which this result is brought about, extends far enough back to overlap and extend rearwardly beyond the knitting leader as shown in Fig. 7. Between A and B shuttles, the guide strands $g\ s$ are lifted by their harnesses so that the nose of the latter shuttle will pass under and lift the guide strands, which rise between the binder warps, and conduct them into their positions between the teeth of the comb. By the B shuttle also the knitting warp, by its leader, is deposited at a point to be engaged by the knitting needles, this warp being laid between the needles and the successive binder warps held by the interlacing arm A'; and the knitting filling, by its leader is laid upon the other side of the needles, between them and the longitudinal strands as indicated in Fig. 5. As the successive binder warps escape from the control of the interlacing arm A' they are outwardly drawn by their tension mechanism, and, in so moving, pull outwardly between the needles loops of knitting warp as far as permitted by the gage $g$ as indicated in Fig. 7. Between the B and C shuttles the regular warps which for the time being are to be in the upper shed, rise and join the binder warps already there and in the shed thus formed the C shuttle lays the weaving weft in the usual way as indicated in Fig. 6. At the rear of the C shuttle all the warps, binder and regular in the upper shed, and the guide strands as well, drop and the operation is again taken up and proceeds in the manner above indicated.

The number of weaving warp strands in the sets or sections, may be changed to any number. The binder warps must necessarily be used to make the fabric complete and homogeneous, but the regular warps may be omitted or multiplied and yet a perfect fabric will result.

Having described our improvement and the best way now known to us of carrying the same into effect, we state in conclusion that we do not limit ourselves to the structural details hereinbefore illustrated and described, for manifestly the same can be considerably varied in many particulars without departure from the spirit of our invention, the leading characteristic of which is that during the progress of the weaving and knitting operations certain of the weaving warps—that is to say, the binder warps, are at their inner ends adjoining the weaving point, carried over on the side of the knitted work above and beyond the path of delivery of the knitting warp, until that warp is delivered to the needles, after which they are permitted to resume their normal and regular position in the weaving warp shed, with the result of being interlooped with said knitting warp, thus interlacing and interlocking the woven and knitted plies in one homogeneous fabric. This feature we believe to be broadly new with us.

Therefore, what we claim as new, and desire to secure by Letters Patent, is as follows:

1. A loom for making a compound homogeneous knit and woven fabric comprising in combination with the knitting mechanism and the weaving mechanism, means, substantially as described, whereby certain of the weaving warps—hereinbefore termed binder warps, are successively carried at their inner ends, to the side of the fabric on which the knitted ply is situated, over and beyond the path of delivery of the knitting warp, are there held until the knitting warp is delivered to the needles, and are then released and caused to resume their regular and normal position in the weaving warp shed, substantially as and for the purpose hereinbefore set forth.

2. In a circular loom, the combination with knitting mechanism for knitting a tubular fabric, and weaving mechanism for forming around the knitted fabric an external woven tube, of an interlacing shuttle provided with an interlacing arm whereby during the travel of the interlacing shuttle, certain of the weaving warps—hereinbefore termed binder warps—are successively taken up by said arm, carried at their inner ends toward the center of the machine over and beyond the knitting needles and path of delivery of the knitting warp, held in that position until the knitting warp is delivered to the needles, and then permitted to drop back and resume their regular position in the weaving warp-shed, substantially as hereinbefore set forth.

3. The combination of the mechanism for forming the exterior woven ply; the knitting needles and actuating mechanism therefor; the knitting shuttle and leader or delivery nozzle carried by the same; and the interlacing shuttle and the interlacing arm carried by the same, the combination being and acting substantially as hereinbefore set forth.

4. The combination with the weaving mechanism for making the exterior woven ply, the interior needle cylinder, needles and needle operating mechanism, and knitting warp delivery devices, of the comb, and the interlacing shuttle formed to carry the binder weaving warps engaged by it over to the comb and deposit them in the spaces between the comb teeth, substantially as hereinbefore set forth.

5. The combination with the weaving and knitting mechanisms, of the central comb provided with a fringe of guide and retaining teeth arranged above the level of the weaving and knitting point, and the interlacing shuttle, provided with an interlacing arm having a curved inner end partially circumscribing the hub of the comb and located above the comb-teeth, substantially as and for the purposes hereinbefore set forth.

6. The combination with the weaving and knitting mechanisms, of the central comb, the interlacing shuttle, and the guide strands, substantially as and for the purposes hereinbefore set forth.

7. The combination of the needle cylinder, needles and operating mechanism therefor; the central comb; the knitting weft or filling leader; the knitting shuttle and knitting warp leader carried by the same; the weaving shuttle and weaving weft delivery devices carried by the same; the weaving warp shed mechanism; the interlacing shuttle and arm carried by the same; and the shuttle driving mechanism, the combination being and acting substantially as hereinbefore set forth.

8. The knitting warp delivery mechanism comprising the combination with the knitting shuttle and leader, of the friction drum means whereby the same is rotated when the shuttle is in motion, and the tension table on the shuttle and apertures therein for the passage of the knitting warp, substantially as and for the purposes hereinbefore set forth.

In testimony whereof we have hereunto affixed our signatures in the presence of two witnesses.

B. L. STOWE.
NATHAN STOWE.

Witnesses:
EVELYN NORRIS,
FRANK R. GRADY.